United States Patent [19]

Lederman

[11] Patent Number: 5,172,878
[45] Date of Patent: Dec. 22, 1992

[54] MOTION TRANSMITTING REMOTE CONTROL ASSEMBLY WITH IMPROVED RETAINERS

[75] Inventor: Frederick E. Lederman, Sandusky, Ohio

[73] Assignee: General Motors Corporation, Detroit, Mich.

[21] Appl. No.: 753,555

[22] Filed: Sep. 3, 1991

[51] Int. Cl.⁵ .................................... F16L 3/00
[52] U.S. Cl. ................................ 248/73; 24/453; 24/458; 74/502.4
[58] Field of Search ............... 248/73, 68.1; 24/458, 24/453, 297; 74/502.4, 502.6

[56] References Cited

U.S. PATENT DOCUMENTS

| | | | |
|---|---|---|---|
| 3,173,987 | 3/1965 | Potruch | 248/68.1 X |
| 3,505,900 | 4/1970 | Stahr | 248/73 X |
| 3,572,160 | 3/1971 | Stahr | 74/502.4 |
| 4,011,770 | 3/1977 | Webb | 74/501 R |
| 4,185,515 | 1/1980 | Webb | 74/502.4 |
| 5,010,781 | 4/1991 | Kirk et al. | 74/502.6 |

FOREIGN PATENT DOCUMENTS

| | | | |
|---|---|---|---|
| 845808 | 8/1952 | Fed. Rep. of Germany | 24/458 |
| 1297407 | 6/1969 | Fed. Rep. of Germany | 248/73 |

Primary Examiner—David L. Talbott
Attorney, Agent, or Firm—Patrick M. Griffin

[57] ABSTRACT

An improved cable retainer for a motion transmitting remote control assembly that can be installed in either direction. The retainer can also be easily molded. A generally elliptical and symmetrical shape is defined by two flexible side walls, which merge to form two rounded ends. Either end can be pushed down into a panel aperture, flexing the side walls in. A cable passage is formed in each end, so that two cables, or different parts of the same cable, can be supported by only one retainer. The retainer has a fail safe feature so that the cable will always stay with the panel, even if it slips out of the passage. In addition, no surface of the retainer has any concavities relative to a central axis, so that it may be axial draw molded with only two molds.

1 Claim, 3 Drawing Sheets

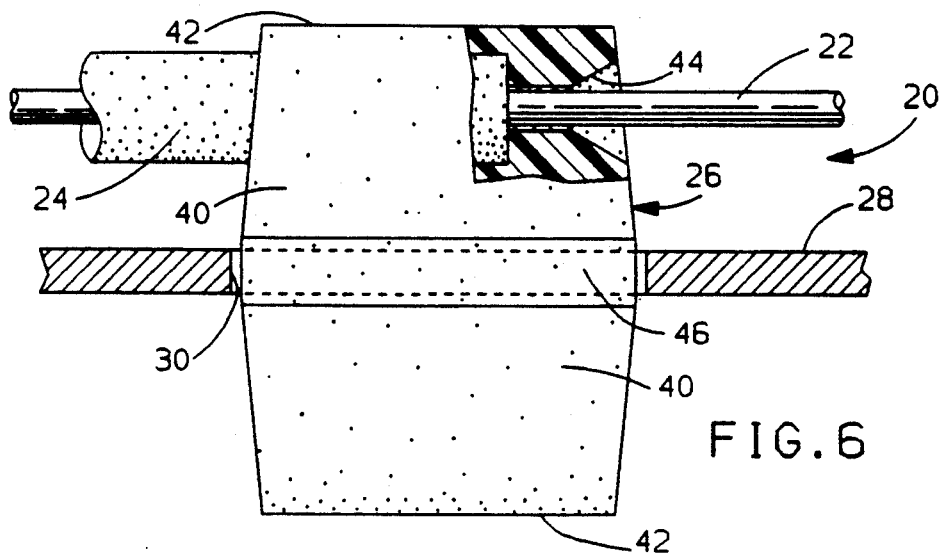
FIG. 6
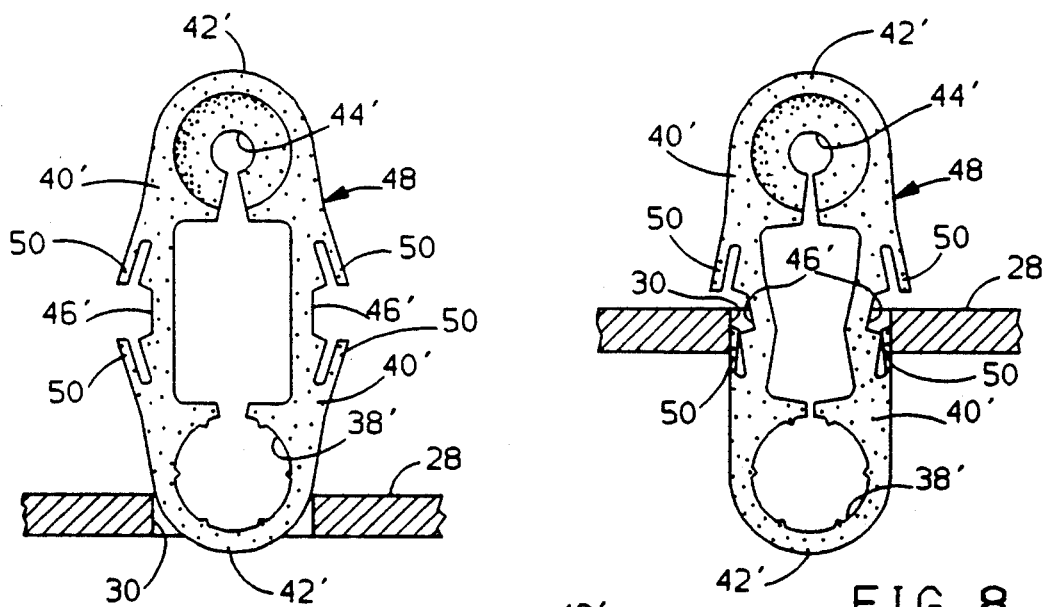
FIG. 7
FIG. 8
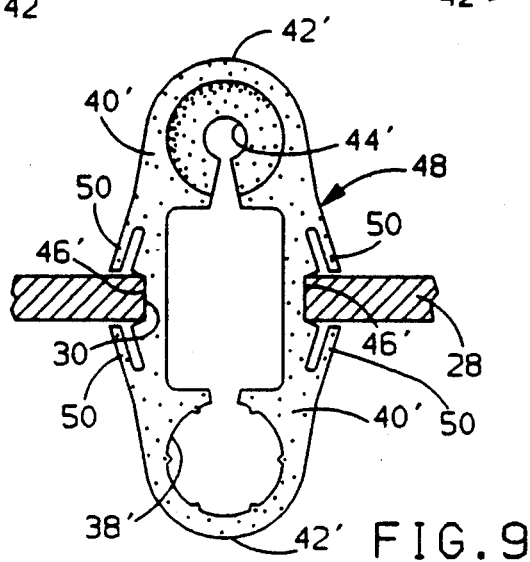
FIG. 9

5,172,878

MOTION TRANSMITTING REMOTE CONTROL ASSEMBLY WITH IMPROVED RETAINERS

This invention relates generally to motion transmitting remote control assemblies of the type that use a cable supported by cable retainers that are installed to a body panel. Specifically, it relates to such an assembly with improved retainers that can be installed to the panel in either direction, and which are easier to manufacture.

BACKGROUND OF THE INVENTION

Automotive vehicles frequently use mechanical remote control assemblies to open various covers, such as hoods, trunks, and fuel filler doors. Such assemblies use a cable, often called a bowden wire, in which a flexible central wire slides through an outer sheath. The sheath is stationary, and has to be securely supported along its length to a panel of the vehicle body. Retainers for such cables generally include a cable receiving passage and a latch that fits tightly into an aperture in the body panel. A different retainer is necessary, depending on what part of the cable is being supported. If the retainer is supporting the cable sheath only, then a constant diameter cable passage is used. If the retainer is supporting the end of the cable, where the thinner center wire exits the sheath, then a stepped diameter is needed.

A recent example of such a retainer is disclosed in U.S. Pat. No. 4,011,770 to Webb. The retainer shown there can be installed only in one direction, and, having only one cable receiving passage, cannot serve multiple functions. The cable retainer shown there is integral to the cable sheath, although versions do exist in which the cylindrical cable receiving passage is open along its length, on the side opposite the latch, giving it a C-shaped cross section. This allows the cable to be snapped into the passage, rather than being threaded through end to end. However, the sides of the open passage have to be made very stiff and inflexible, because if the cable snaps out, it loses all retention to the panel. Another drawback of the design is that it contains numerous overlapping surfaces, which would prevent it from being molded by the so-called bypass or axial draw technique.

SUMMARY OF THE INVENTION

The improved retainer of the invention is bidirectional, and can be installed to the panel in either direction. The cable can be easily fitted into either of two cable receiving passages, and will not be lost from the panel even if it snaps out. The retainer also has a shape that can be easily manufactured.

The retainer is a one-piece plastic shell of generally elliptical shape. The elliptical shape is defined by two side walls which, being plastic, are resilient and flexible. The outer surfaces of the walls are spaced apart, in a free state, by more than the width of the aperture in the body panel, and the inside surfaces are spaced apart by more than the diameter of the cable. The side walls converge into a pair of opposed rounded ends that are narrower than the body panel aperture. Each of the rounded ends has a cable receiving passage molded through it, parallel to the central axis. The cable receiving passages in each retainer may be the same, or they can differ. The retainer shape is substantially symmetrical about both a horizontal and vertical plane. The planes intersect at a central axis, and no surface of the retainer has any undercuts or concavities relative to that central axis, allowing it to be molded with only two molds.

Given the shape and size of the retainer it can be installed by pushing either of the rounded ends into and through the aperture. The side walls flex together, out of the free state, and so are resiliently biased into the edges of the aperture to support the retainer to the panel. Since the retainer has two cable receiving passages, it is capable of supporting a cable on one or both sides of the panel, and capable of supporting any part of the cable. In the embodiments disclosed, the cable receiving passages are also open along their length, but the opening is bounded by the flexible side walls. This allows the cable to be threaded between the side walls and snapped out into the passage before or after the retainer is installed. Even if the cable pops out of the passage, it will still be trapped between the end of the retainer and the panel.

It is, therefore, a general object of the invention to provide a motion transmitting remote control assembly with improved cable retainers.

It is another object of the invention to provide such a retainer in which essentially the entire body flexes as it is installed, so that a simpler and easier to mold shape can be used.

It is another object of the invention to provide a bi-directional retainer with a generally elliptical shape defined by flexible, resilient side walls that merge into two opposed rounded ends, allowing the retainer to be pushed into the aperture in either direction.

It is still another object of the invention to provide such a retainer that has two cable receiving passages, one at each end.

It is yet another object of the invention to provide such a retainer in which the cable may be easily fitted to the retainer, before or after the retainer has been installed, but will not be lost from the panel if it slips out of the retainer.

DESCRIPTION OF THE PREFERRED EMBODIMENT

These and other objects and features of the invention will appear from the following written description, and from the drawings, in which:

FIG. 1 is a perspective view of one embodiment of the improved cable retainer of the invention;

FIG. 2 an axial end view of the retainer;

FIG. 6 is a side view of the installed retainer with the cable added, showing part of the cable passage broken away;

FIG. 7 is an end view of another embodiment at the start of installation;

FIG. 8 is a view like FIG. 7 near the end of installation;

FIG. 9 is a view of the retainer completely installed, before the cable is added;

Referring first to FIG. 6, a motion transmitting remote control assembly using the improved cable retainers of the invention is indicated generally at 20. The cable is comprised of a central wire 22 slidably received within a stationary outer sheath 24. Sheath 24 is held by one embodiment of the retainer of the invention, indicated generally at 26, which includes several features common to other embodiments described below. All of the retainers are adapted to be installed to a vehicle body panel 28 by being press fitted into an aperture 30, and each is designed so that it can be installed in either direction.

Figure 1:
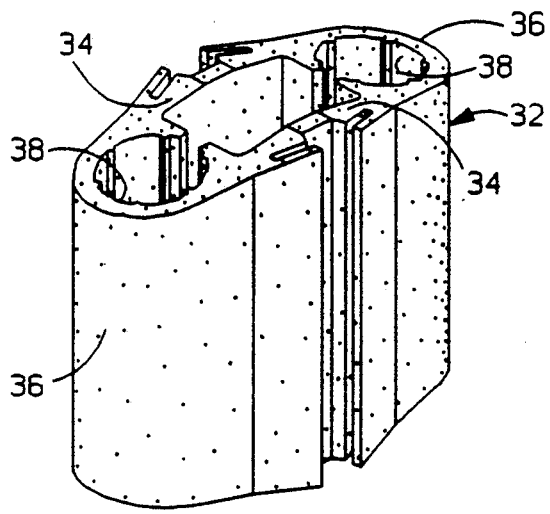
Figure 2:
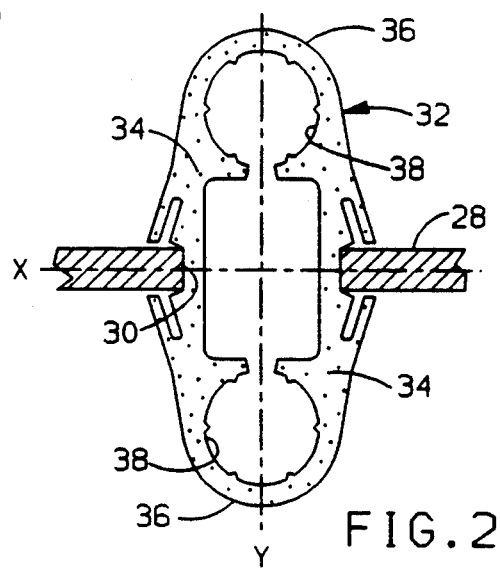

Referring next to FIGS. 1 and 2, another embodiment of the retainer is indicated generally at 32. Every embodiment is a one piece, molded plastic shell of generally elliptical shape. The general shape is defined by a pair of spaced side walls 34 that merge into a pair of rounded ends 36. A cable receiving passage 38 is formed through each end 36 which, in the embodiment shown, is of constant diameter and the same shape for each end 36. All the embodiments are substantially symmetrical about both a horizontal plane X coextensive with panel 28 and a vertical plane Y, the intersection of which defines a central axis. All of the surfaces of retainer 32, including inner and outer surfaces of the side walls 34 and the cable passages 38, are designed so as to have no undercuts or concavities relative to that central axis. Therefore, it may be simply molded by only two molds that part along the central axis, the so-called bypass or axial draw technique. In addition, all the surfaces of retainer 32, as well as some of the other embodiments shown, have no slope change at all relative to the central axis, either positive or negative. Consequently, it could be manufactured even more simply, by cutting slices from a single long extrusion.

Figure 3:
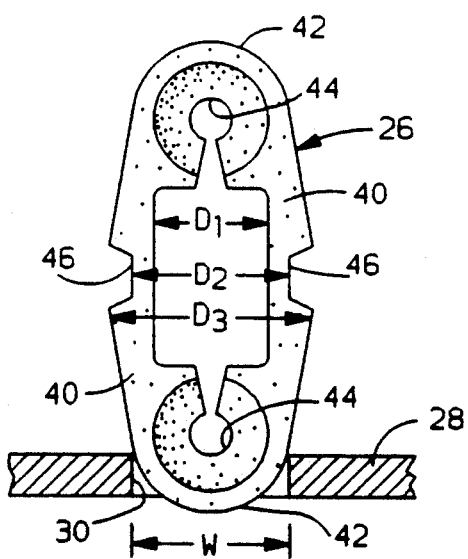
FIG. 3 is an an end view of another embodiment at the start of installation to the panel.

Referring next to FIG. 3, additional details of retainer 26 are described. Retainer 26 also has side walls 40 that merge at rounded ends 42 with passages 44 molded therethrough. The passages 44 in retainer 26 are stepped cylinders, which are intended to support the end of the cable sheath 24 where the wire 22 exits. The passages 44 are open along their length, in key hole fashion, but they open to the interior of retainer 26, between the side walls 40, not to the exterior. Consequently, the rounded ends 42 are not interrupted. As with all embodiments, the side walls 40 are molded of a plastic material that is flexible and resilient, which allows them to flex in or out from the free state shown, with a tendency or bias to flex snap back. In the free state shown, the outer surfaces of the side walls 40 taper from their center to the ends 42, and have a greatest separation $D_3$, measured normal to the Y plane, that is greater than the width W of aperture 30. The least separation, at the rounded ends 42, is less than W. The inner surfaces of the side walls 40 have a separation $D_1$ greater than the diameter of cable sheath 24. A pair of grooves 46 formed in the outer surface of side walls 40 along the X plane have a separation $D_2$ that is substantially equal to W. The length of retainer 26, as well as the other embodiments, would be equal to or less than the length of aperture 30. These relative dimensions allow retainer 26 to be easily installed, as described next.

Figure 4:
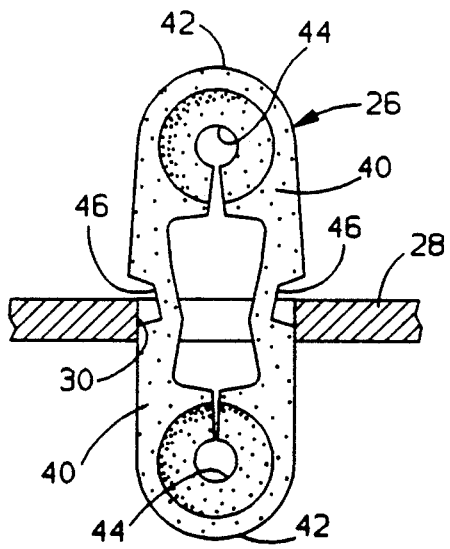
FIG. 4 is a view like FIG. 3 near the end of installation.
Figure 5:
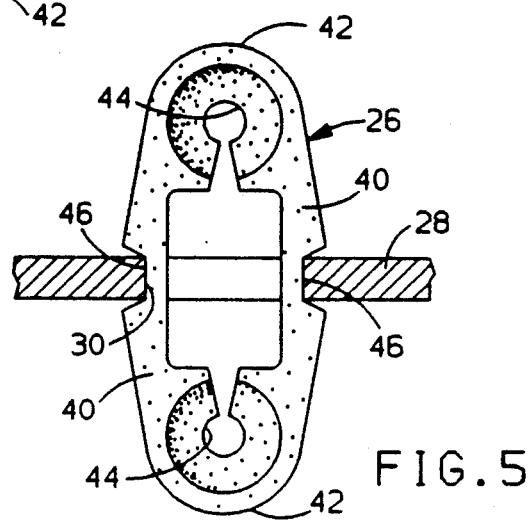
FIG. 5 is a view of the retainer completely installed, before the cable is added.

Referring next to FIGS. 4 through 6, retainer 26 is installed by pushing either rounded end 42 through aperture 30. Pushing retainer 26 down causes the edges of aperture 30 to slide along the tapering side walls 40, flexing them toward one another. In effect, the entire body of the retainer 26 flexes, rather than just a separately molded rib or flange, making maximum use of its simple shape. The key hole opening in the cable passages 44 closes up to an extent, so as not to restrict the flexing of the side walls 40. When the grooves 46 reach the edges of the aperture 30, the side walls 40 return to their free state, and the retainer 26 is prevented by the grooves 46 from pulling out in either direction. Retainer 26, could be removed at this point, if desired, by deliberately pinching the side walls 40 together and pulling it out of aperture 30. Once retainer 26 is installed, the end of the cable sheath 24 is pushed into the cable passage 44 on either or both sides of panel 28. Or, the cable sheath 24 could be added before retainer 26 was installed, although the flexing of the side walls 40 would then be more restricted. It can be seen that should cable sheath 24 somehow snap out of the open side of passage 44, it would still be trapped between the rounded retainer end 42 above it and the panel 28, and would not be lost.

Figure 10:
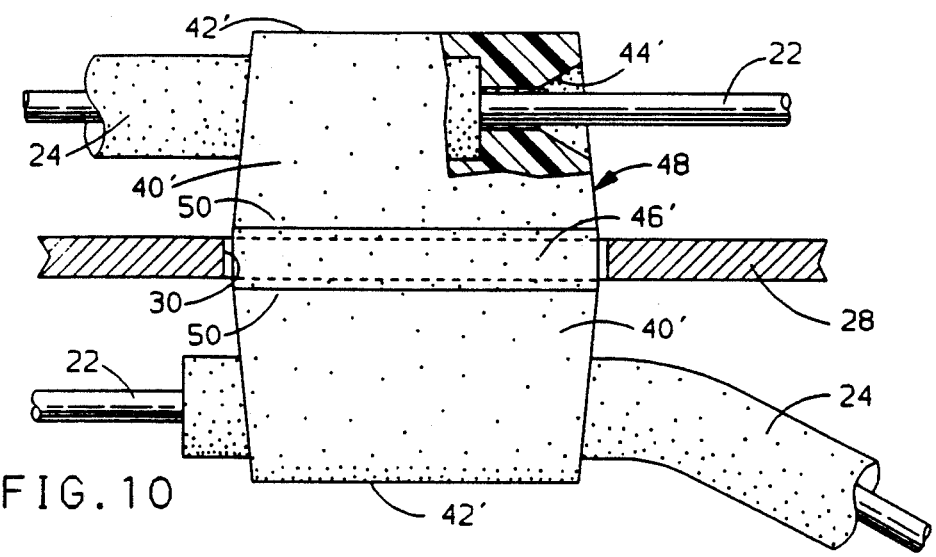
FIG. 10 is a side view of the FIG. 7 embodiment with two cables added.

Referring next to FIGS. 7 through 10, another embodiment 48 has most of the same basic features of retainer 26, which are described with the same number primed, as well as some additional features. The grooves 46' are bounded by pairs of flexible support legs 50, which parallel the tapered side walls 40', but do not overlay the grooves 46'. One of the cable passages, indicated at 38', is like those in retainer 32, and designed to support the cable sheath 24 along its length, rather than at the end. Retainer 48 is installed in the same way, as seen in FIGS. 8 and 9. The support legs 50 flex in along with the side walls 40', and then back out, ending up close to the surfaces of panel 28 adjacent the edges of the aperture 30. The support legs 50 add additional security and stability to retainer 48 after it is installed. However, retainer 48 would be more difficult to deliberately remove than retainer 26, since the legs 50 act as a latch or lock. As shown in FIG. 10, the retainer 48 can support the end of a cable sheath 24 on one side of panel 28, and the length of a cable sheath 24 on the other. Or, if only one cable was to be used, the two different cable passages 44' and 38' could be color coded or otherwise marked so that the proper one could be chosen, depending on which part of the cable was to be supported.

Figure 11:
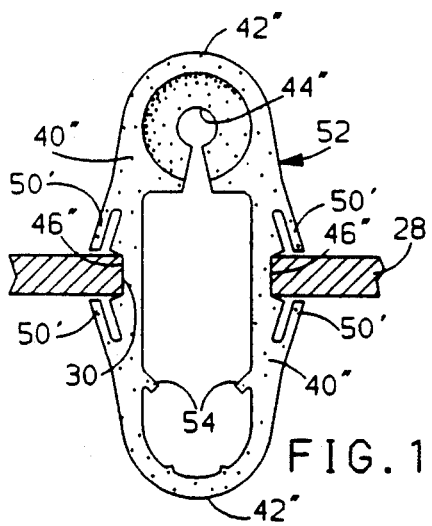
FIG. 11 is an end view of another embodiment installed, before any cables are added.
Figure 12:
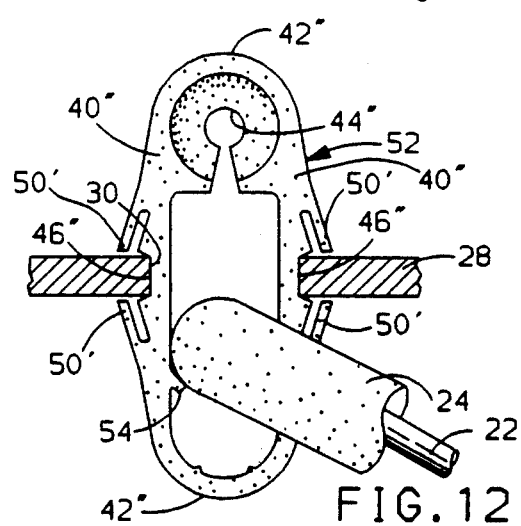
FIG. 12 shows a cable beginning to be added to the FIG. 11 retainer.
Figure 13:
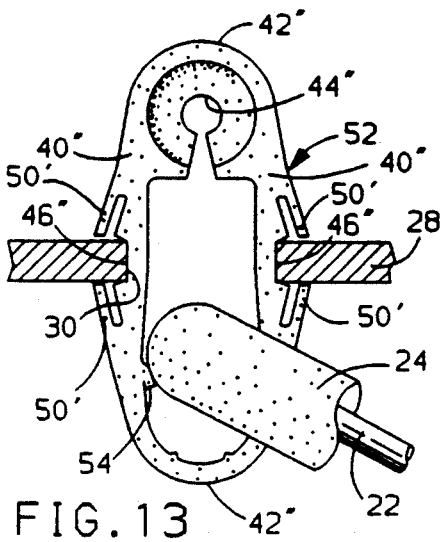
FIG. 13 shows the cable partially snapped into the cable receiving passage.
Figure 14:
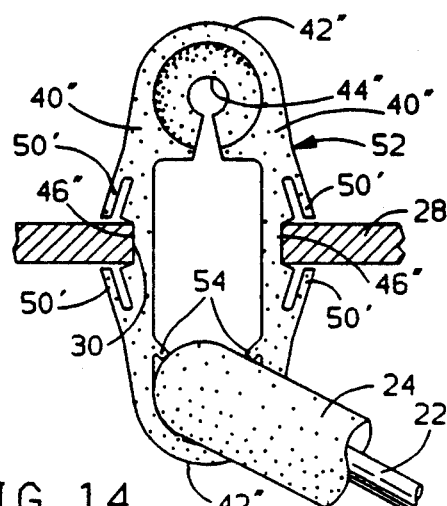
FIG. 14 shows the cable completely installed.

Referring next to FIGS. 11 through 14, another embodiment 52 is shown, which is very similar to retainer 48, with similar features identified by the same number with a double prime. The one difference is that one end 42" contains a cable receiving passage that is almost completely open between the side walls 40", being defined only by a pair of short barbs 54. Retainer 52 is installed just like retainer 48, as shown in FIG. 11. Once installed, a cable sheath 24 can be snapped down easily between and past the barbs 54, as shown in FIGS. 12 and 13. The side walls 40" flex outwardly to allow the cable sheath 24 to enter. Again, if cable sheath 24 should pop out from between the barbs 54 for any reason, it will still be trapped between the retainer end 42", and the panel 28.

Variations could be made in the embodiments disclosed. A retainer could be made that was not completely symmetrical to both planes X and Y, so as to accommodate situations where there was less room on one side of panel 28, or less room on one side of aperture 30 than the other. The total symmetry shown is an advantage, however, especially in the embodiments with identical cable passages, in that no orienting of the retainer is necessary by the installer. Even if only one cable passage is to be actually used, it is no more expensive to mold the retainer with two than with one, given its simple shape. The cable passages would not have to be open along their length, although doing so serves both to enhance the flexibility of the retainer and ease installation of the cable, without risking loss of the cable. The grooves 46 could be eliminated, if the edges of the aperture 30 were sharp enough. Just the return bias of the inwardly flexed resilient side walls 40 into the sharp edges could be enough to keep the retainer in place, although pull out resistance would be less. A retainer shape that was not totally flat or smooth relative to the central axis could be used in a situation where something like a localized bulge on the cable sheath 24 had to be accommodated. Such a design could not be bypass molded, however, which is a great advantage. Therefore, it will be understood that it is not intended to limit the invention to just the embodiment disclosed.

I claim:

1. In a motion transmitting remote control assembly of the type that uses a flexible cable of predetermined diameter, an improved cable retainer for installation to a planar panel having a aperture therethrough, the edges of which are separated by a predetermined width, said retainer comprising, a generally elliptical shell having a pair of resilient and flexible side walls with inner surfaces and outer surfaces, said inner surfaces being spaced apart, in a free state, by more than said cable diameter and with said outer surfaces being spaced apart by more than said aperture, said side walls further converging into a pair of opposed ends with a width less than said aperture, each of said ends having a cable receiving passage therethrough that is open along its length into the space between said side wall inner surfaces, whereby said retainer may be installed in each direction by pushing a selected one of said ends into said aperture, thereby flexing said side walls together and out of said free state to engage the edges of said aperture and hold said retainer to said panel with a cable receiving passage located to either side of said panel, after which said cables may be introduced between said side walls and pushed into said open cable receiving passages.

* * * * *